(12) United States Patent
Bahn

(10) Patent No.: US 9,677,503 B2
(45) Date of Patent: Jun. 13, 2017

(54) ROCKET ENGINE SYSTEMS

(75) Inventor: Patrick R. E. Bahn, Washington, DC (US)

(73) Assignee: TGV ROCKETS, INC., Washington, DC (US)

(*) Notice: Subject to any disclaimer, the term of this patent is extended or adjusted under 35 U.S.C. 154(b) by 396 days.

(21) Appl. No.: 13/590,172

(22) Filed: Aug. 20, 2012

(65) Prior Publication Data

US 2014/0083081 A1 Mar. 27, 2014

Related U.S. Application Data

(60) Provisional application No. 61/575,258, filed on Aug. 18, 2011.

(51) Int. Cl.
| | |
|---|---|
| F02K 9/60 | (2006.01) |
| B64G 1/40 | (2006.01) |
| B64G 1/52 | (2006.01) |
| F02K 9/08 | (2006.01) |
| F02K 9/46 | (2006.01) |
| F02K 9/72 | (2006.01) |
| B64G 1/00 | (2006.01) |
| F02K 9/96 | (2006.01) |

(52) U.S. Cl.
CPC ............ *F02K 9/605* (2013.01); *B64G 1/002* (2013.01); *B64G 1/40* (2013.01); *B64G 1/52* (2013.01); *F02K 9/08* (2013.01); *F02K 9/46* (2013.01); *F02K 9/72* (2013.01); *F02K 9/96* (2013.01); *F05D 2220/80* (2013.01); *Y10T 29/49346* (2015.01)

(58) Field of Classification Search
CPC ..... F02K 9/72; F02K 9/68; F02K 9/84; F02K 9/34; F02K 9/70; F02K 9/64; F02K 9/42; F02K 9/52; F02K 9/48; F02K 9/50; F02K 7/18; F02K 1/822; F02K 5/02; F02K 9/08; F02K 9/10; F02K 9/38; F02K 9/44; F02K 9/46; F02K 9/62; F02K 9/76; F02K 9/95; F02K 9/346; F02K 9/605; F02K 9/974; F02K 7/10; F02K 7/12; C06B 47/00; B64C 1/401; B64C 1/402; B64C 1/60; B64C 1/12; B64C 11/001; F03H 99/00; B64G 1/26; B64G 1/40; B64G 1/52; Y02T 50/671; Y02T 50/675; F02C 7/18
USPC ...... 60/251, 200.1, 253, 252, 257, 915, 259; 244/171.1, 172.2, 171.9
See application file for complete search history.

(56) References Cited

U.S. PATENT DOCUMENTS

| | | | | |
|---|---|---|---|---|
| 3,807,657 | A * | 4/1974 | Brill | 244/1 R |
| 5,063,734 | A * | 11/1991 | Morris | 60/204 |
| 5,407,331 | A * | 4/1995 | Atsumi | 417/420 |
| 5,572,864 | A * | 11/1996 | Jones | 60/220 |
| 5,628,476 | A * | 5/1997 | Soranno | B64G 1/12 244/172.1 |

(Continued)

FOREIGN PATENT DOCUMENTS

RU 2204046 C2 * 5/2003

*Primary Examiner* — Steven Sutherland

(57) ABSTRACT

The present invention relates to improved rocket engine systems. In one embodiment, an improved rocket engine system includes a propellant source, at least one power source, at least one power source motor, a rocket engine, and at least one pump. The improved rocket engine system may further include at least one of the following: at least one controller, at least one propellant valve, and a propellant pressurizing source.

12 Claims, 3 Drawing Sheets

(56) References Cited

U.S. PATENT DOCUMENTS

| | | | |
|---|---|---|---|
| 5,722,232 A * | 3/1998 | Jones | 60/259 |
| 6,314,718 B1 * | 11/2001 | Schneider | 60/218 |
| 6,457,306 B1 * | 10/2002 | Abel et al. | 60/204 |
| 7,762,498 B1 * | 7/2010 | Henderson et al. | 244/171.1 |
| 2002/0171011 A1 * | 11/2002 | Lopata et al. | 244/172 |

* cited by examiner

ROCKET ENGINE SYSTEMS

CROSS-REFERENCE TO RELATED APPLICATION

The present application claims the priority benefit of U.S. Provisional Patent Application Ser. No. 61/575,258, filed Aug. 18, 2011, which is incorporated herein by reference in its entirety.

FIELD OF THE INVENTION

The present invention relates generally to rockets, space transportation vehicles, launch vehicles and systems, crew escape vehicles and systems, space vehicle systems and devices, electrical motors, pumps and electricity sources, and rocket engine systems. More specifically, the present invention is directed to improved rocket engine systems.

BACKGROUND OF THE INVENTION

Rockets, space transportation vehicles, launch vehicles and systems, crew escape vehicles and systems, space vehicle systems and devices, electrical motors, pumps and electricity sources, and rocket engine systems are known in the art. The following patent documents below disclose and show some of these examples.

U.S. Pat. No. 3,001,739, issued to Faget, et al. on Sep. 26, 1961, discloses a space capsule having a blunt forebody, a narrow afterbody and a top cylindrical container is shown as being positioned atop a launching vehicle, such for example as a rocket or missile motor, by means of an adapter pedestal secured to the nose portion of the launching vehicle. The capsule is detachably seated upon the pedestal by a circumscribing split ring having one or more explosive bolts connected between segments of the split clamp ring. Mounted atop the capsule container is the emergency separation unit of the present invention. The unit consists of separate rocket motors and supported by a tower. The base of the tower is detachably secured to the capsule container by a clamp ring having one or more explosive bolts normally maintaining the segments thereof in a continuous ring. The rocket motor is of a size suitable to rapidly lift the capsule a predetermined safe separation distance from the launching motor in the event of an impending failure thereof. A preferred rocket motor design would provide for a separation distance of approximately 250 feet during the first second of rocket motor operation. The rocket motor is provided with three nozzles which nozzles are equidistantly spaced and suitably canted so as to direct the rocket blast outward and away from the tower and capsule. The rocket motor is positioned under rocket motor and is of a suitable size to effect jettisoning of the separation unit, as will be more fully explained hereinafter. A ballast is positioned on the rocket motor for maintaining the capsule statically stable and trim in the same attitude as the capsule would maintain during a normal launching. An aerodynamic spike may be vertically disposed atop the ballast for developing a shock wave which will reduce the heating of the capsule by aerodynamic friction during the launching flight period.

U.S. Pat. No. 3,576,298, issued to Barnett, et al. on Apr. 27, 1971, discloses an aerospace vehicle is described comprising a substantially conical forward crew compartment or command module mated to a substantially cylindrical rearward service module. Aerodynamic fairings are provided along the midline on the sides of the cylindrical portion and a substantial distance aft thereof for providing lift at hypersonic velocities and approximately vertical fins are provided on the fairings for aerodynamic stability and control. Wings are mounted within the aerodynamic fairings at high velocities and pivotably extended therefrom at lower velocities and altitudes to provide low speed lift. Upon reentry into the earth's atmosphere hypersonic lift is provided by the body and the fairings for bringing the vehicle to the area of a selected landing site and, at lower flight speeds deeper into the atmosphere, augmented lift is provided by the extended wings for landing the vehicle on a conventional runway. A rocket engine for propulsion has a large expansion ratio bell for use in the vacuum of space. The large ratio bell is jettisonable to give a low expansion ratio for use of the same engine within the atmosphere. Rear landing skids are pivotable into and out of the wake of the vehicle to reduce the requirement for heat shielding. Similarly, reaction control rocket motors are also pivotable into and out of the wake of the vehicle for minimizing heat protection requirements. Such a vehicle is readily adaptable to a broad variety of space missions such as cargo ferry or satellite recovery, and is reuseable with minimum refurbishment.

U.S. Pat. No. 3,999,728, issued to Zimmer on Dec. 28, 1976, discloses an escape capsule integrally designed within a parent aircraft and having a fly-away capability throughout the entire speed range of the parent aircraft. The capsule utilizes segments of the leading edges of the aircraft wings to provide flight capability and stabilization to the capsule, an elevon system controlling the capsule about both its lateral and longitudinal axes, and rudder and vertical stabilizing elements for controlling the capsule about its vertical axis. A rocket is provided to supply the thrust necessary to accomplish positive separation of the capsule from the parent aircraft along a required trajectory. A thrust system, such as a turbojet or fan jet engine, is provided for sustaining the capsule in flight.

U.S. Pat. No. 4,887,780, issued to Goodrich, et al. on Dec. 19, 1989, discloses an orbiter escape pole. A shuttle type of aircraft with an escape hatch has an arcuately shaped pole housing attachable to an interior wall and ceiling with its open end adjacent to the escape hatch. The crew escape mechanism includes a magazine and a number of lanyards, each lanyard being mounted by a roller loop over the primary pole member. The strap on the roller loop has stitching for controlled release, a protection sheath to prevent tangling and a hook member for attachment to a crew harness.

U.S. Pat. No. 5,143,327, issued to Martin on Sep. 1, 1992, discloses a heavy launch vehicle for placing a payload into a spatial Earth orbit including an expendable, multi-container, propellant tank having a plurality of winged booster propulsion modules releasably disposed about one end thereof; and a payload supported by adapter structure at the other end. The preferred payload is an entry module adapted to be docked to a space station and used as a return vehicle for the space station crew, as scheduled, or in emergency situations. Alternately, the payload may include communication satellites, supplies, equipment and/or structural elements for the space station. The winged propulsion modules are released from the expendable propellant tank in pairs and return to Earth in a controlled glide, for safe landing at or near the launch site and prepared for reuse. The rocket engines for each propulsion module are dual-fuel, dual-mode engines and use methane-oxygen and hydrogen-oxygen, respectively, from the multi-containers of the propellant tank. When the propulsion modules are released from the expendable propellant tank, the rocket engines are pivotally moved into the module cargo bay for the return glide flight.

U.S. Pat. No. 5,526,999, issued to Meston on Jun. 18, 1996, discloses a spacecraft with a crew escape system. The spacecraft comprises a fuselage, a wing, a power unit incorporating two liquid-propellant launching rocket engines, two liquid-propellant boost rocket engines, six transverse-thrust rocket engines located in the spacecraft fuselage on a rotatable ring, solid-propellant emergency deceleration rocket engines, and solid-propellant additional boosting rocket engines, a payload compartment, a crew compartment, a tail unit with two vertical fin struts, a bottom tailplane, and a top tailplane. The fuselage is provided with a movable center conical body. The spacecraft landing gear has a swivelling tail wheel. The crew compartment is interposed between the fin struts under the top tailplane. The spacecraft is provided with an orbital maneuvering system whose final control elements are in fact low-thrust rocket engines, and gyrodynes. The crew escape system comprises an escape module which is in fact a recoverable ballistic capsule held to the end face of the tail portion of the fuselage. The capsule communicates with the crew compartment through a tunnel provided with means for crew transfer from the crew compartment to the capsule. The capsule has a front and a rear hatch, an aerodynamic decelerator, and a parachute system. The front portion of the capsule has a heat-protective coating. The center of mass of the capsule is displaced towards its front portion.

U.S. Pat. No. 5,572,864, issued to Jones on Nov. 12, 1996, discloses a solid-fuel, liquid oxidizer hybrid rocket turbopump auxiliary engine. A propulsion thruster includes a solid-fuel, liquid-oxidizer main rocket engine, a tank of liquid oxygen, and a turbine-driven pump for pumping liquid oxygen to the main engine. A solid-fuel, liquid-oxidizer auxiliary engine has its oxidizer input port coupled to the output of the turbopump, for generating drive fluids for the turbine of the turbopump. The temperature of the turbine drive fluids is reduced to prevent damage to the turbine, and the mass flow rate is increased, by injecting water from a tank into the drive fluids at the output of the auxiliary engine. Starting is enhanced by preventing cooling of the solid fuel by the liquid oxidizer, which is accomplished by applying gaseous oxygen from a tank to the oxidizer input port of the auxiliary engine.

U.S. Pat. No. 6,629,673, issued to Casillas, et al. on Oct. 7, 2003, discloses an adaptable solid-hybrid rocket for crew escape and orbital injection propulsion. The invention relates to a propulsion system for transporting a crew transfer vehicle. The propulsion system has a casing which defines a chamber, a solid propellant system positioned within the chamber for generating one of emergency escape propulsion during an emergency portion of an ascent flight and orbital injection propulsion during normal flight operations, and a sustain propulsion system communicating with the chamber for sustaining one of the emergency escape propulsion during the emergency portion of the ascent flight and orbital injection propulsion during the normal flight operations. In one embodiment of the invention, the sustain propulsion system comprises a hybrid solid fuel grain and liquid oxidizer system. In a second embodiment of the invention, the secondary propulsion system comprises a liquid fuel and liquid oxidizer system.

U.S. Pat. No. 7,484,692, issued to McKinney, et al. on Feb. 3, 2009, discloses an integrated abort rocket and orbital propulsion system. An orbital stage system has an orbital stage and one or more launch stages. The orbital stage incorporates an orbital maneuvering system (OMS) and an abort propulsion system which both utilize the same propellants, propellant tankage, and propellant pressurization system, but which employ radically different engines. The OMS engines are comprised of at least two engines which have a combined thrust in the neighborhood of $\frac{1}{10}$ the weight of the orbital stage, an area ratio of 50 or more and an operating life of many hundred seconds, preferably many thousands of seconds or more. The abort engine may be a single engine and typically has a thrust of three, four, or more times the weight of the vehicle and an area ratio in the neighborhood of two and an operating life of at most a few tens of seconds.

U.S. Patent Application No. 2007/0012821, published to Buehler on Jan. 18, 2007, discloses that a launch vehicle upper-stage escape system allows a crew capsule or a payload capsule to be safely and rapidly separated from a launch vehicle in the event of an emergency using the upper stage main engine for propulsion. During the initial portion of the flight the majority of the propellant mass for the upper stage is stored in the lower stage. This minimizes the mass of the upper stage allowing the upper stage main engine to provide sufficient acceleration to lift the capsule off of the launch vehicle and to move the capsule away from the launch vehicle to a safe distance with sufficient speed in the event of an emergency. It can also be used to lift the crew or payload capsule to a sufficient height for recovery systems to be employed successfully in the event of an on-pad or low-altitude launch emergency.

U.S. Patent Application No. 2008/0265099, published to Camarda, et al. on Oct. 30, 2008, discloses an annular fairing having aerodynamic, thermal, structural and acoustic attributes that couples a launch abort motor to a space vehicle having a payload of concern mounted on top of a rocket propulsion system. A first end of the annular fairing is fixedly attached to the launch abort motor while a second end of the annular fairing is attached in a releasable fashion to an aft region of the payload. The annular fairing increases in diameter between its first and second ends.

U.S. Patent Application No. 2009/0211258, published to Bulman on Aug. 27, 2009, discloses that improved rocket nozzle designs for vehicles with nozzles embedded in or protruding from surfaces remote from the desired thrust axis. The nozzle configurations are for rocket vehicles where the nozzles are not located at the optimal thrust axis of the vehicle. Two examples include nozzles located on the forward end of the vehicle (also called tractor nozzles) and attitude control nozzles located on the periphery of the vehicle. More particularly, the disclosed nozzle shapes enhance the axial thrusts and/or maneuver torques on the vehicle. These unconventional nozzle shapes improve vehicle performance.

WIPO Application No. WO 2008/105967 A2, published to Raytheon Company on Sep. 4, 2008, discloses a propulsion system that includes a canted multinozzle plate, which has a multitude of small nozzles angled (not perpendicular) to major surfaces of the multinozzle grid plate. The multinozzle plate may be a cylindrical section or plate, and the multitude of nozzles may be substantially axisymmetric about the cylindrical plate. The propulsion system includes a pressurized gas source which may be placed either forward or aft of the multinozzle grid plate. The propulsion system may have a conical insert, an internal flow separator cone, to aid in changing directions of flow from the pressurized gas source, to divert the flow through the multiple nozzles.

U.S. Pat. No. 6,457,306, issued to Abel, et al. on Oct. 1, 2002, discloses a liquid propellant supply system being electrical in nature and avoids the need for a gas generator and a turbine assembly. In particular, the system includes an electrical power source, a controller and a motor for driving the pump.

U.S. Pat. No. 7,762,498, issued to Henderson, et al. on Jul. 27, 2010, discloses a high-efficiency spacecraft propulsion system, including includes electric pumps inserted in the oxidizer and fuel lines that increase liquid apogee engine ("LAE") operating pressure and reduce tank-operating pressure. An on-board computer generates pump drive signals, in response to measured oxidizer and fuel line pressures, that are input to the pump controller electronics.

U.S. Patent Application No. 2011/0017873A1, published to Raymond on Jan. 27, 2011, discloses an apparatus for driving a pump for fueling a rocket engine of a space vehicle. The apparatus comprises an inertia wheel and a transmitting device to transmit a rotation of the inertia wheel to the pump. The apparatus further comprises a measuring device to measure the rotation speed of the inertia wheel a clutching device to decouple the wheel and the pump for a speed lower than a pre-determined speed lower, which is lower than the nominal rotation speed of the wheel. The invention is particularly applicable to a space vehicle comprising a rocket engine wherein the fuel supply system comprises at least one pump driven by the apparatus of the invention and a starting device to start the apparatus while the space vehicle is in flight.

U.S. Patent Application No. 2009/0293448A1, published to Grote, et al. on Dec. 3, 2009, discloses a rocket engine for use in space transport industry, includes recirculating cooling system coupled to gap between inner and outer shells, in at least two locations, to recirculate convective coolant through gap. The pump of propulsion system is a centrifugal pump driven by an electric motor.

U.S. Pat. No. 5,407,331, issued to Atsumi on Apr. 18, 1995, discloses a motorised vehicle fuel pump that has inner rotating wheel on bearing with magnet on bearing which is lubricated and cooled by fuel.

U.S. Pat. No. 5,636,512, issued to Culver on Jun. 10, 1997, discloses a nuclear thermal rocket engine for space missions that comprises auxiliary feed apparatus coupled to primary feed apparatus, and operatable in zero, low and high thrust modes.

U.S. Pat. No. 5,475,722, issued to Culver on Dec. 12, 1995, discloses a nuclear thermal rocket engine that comprises nuclear reactor core with multiple fuel assemblies, reflector assembly surrounding core, vessel housing reflector and core, etc. To help start pumps, an electric pump is positioned along an alternative flow path between main tank and pumps. Electric pump initially draws hydrogen from main tank to start the flow of hydrogen through pumps. Once pumps begin running, electric pump is turned off and the hydrogen flows through valves. Electric pump can also be used as a back-up pump if a mechanical problem occurs or for low thrust operation during flight.

U.S. Pat. No. 7,104,507, issued to Knight on Sep. 12, 2006, discloses a manned rocket for space tourism that has air-breathing external combustion rocket engine with fuel tank configured to contain fuel combustible with air, where combustor is connected to fuel tank.

U.S. Pat. No. 3,021,671, issued to Wallach on Feb. 20, 1962, discloses a rocket engine, consisting in principle of a combustion chamber which is rear to front charged, an appliance chamber containing an electric motor, two high-pressure reciprocal pumps, two air-traps and an electric battery or batteries; further it consists of a liquid fuel and oxidizer compartment; such liquid fuel and oxidizer compartments being interconnected with the rear of the combustion chamber by means of suitable ducts, and such ducts interposed with appropriate artifices such as a reciprocal pump and an airtrap.

U.S. Pat. No. 3,017,745, issued to Shirley, et al. on Jan. 23, 1962, discloses a pressure responsive switch, comprising a diaphragm associated with electrical contacts, is also connected to the main hydrogen peroxide supply line between the hydrogen peroxide pump and the on/off valve referred to, and this switch is arranged to interrupt the power supply to the electric motor driving the starter pump when the pressure of hydrogen peroxide in the main supply line reaches a predetermined value which is sufficient to provide oxygen and superheated steam to drive the turbine.

U.S. Pat. No. 3,516,251, issued to Andrews, et al. on Jun. 23, 1970, discloses that instead of driving the pumps by the turbine, they may be driven by an electric motor.

U.S. Pat. No. 5,636,509, issued to Abel on Jun. 10, 1997, discloses a heat and pressure energy conservation rocket powered flywheel engine that has non-radial propulsion units for generating thrust having drive shaft mounting for rotation and heat conservation unit for reclaiming heat energy. Stored electrical energy from the battery may be used to drive electrical systems that may include electric motors used to power starters or rocket igniters or other systems associated with the engine and vehicle.

U.S. Patent Application No. 2003/0010013A1, published to Johnstone on Jan. 16, 2003, discloses a catalytic turbine in electric power generation system that has rocket engines that produce steam exhaust without toxins, by combustion of hydrogen produced by reaction of water with metal hydride. The fuel preferably is fed to the system initially by a manual pump, or by an electric pumping system. Once the rotor assembly begins to turn, however, a mechanical or electric pump connected to a drive link on the rotor assembly can draw the fuel from the tank to the tip of the impeller blades in the rotor assembly.

U.S. Pat. No. 6,371,740, issued to Jansen on Apr. 16, 2002, discloses a combustible fuel supply system for gas turbine, rocket or jet engine, that includes fuel metering pump which provides constant pressure fuel to fuel consumption device without using accumulator metering valve.

U.S. Patent Application No. 2011/0017874A1, published to Haase on Jan. 27, 2011, discloses a storing method for fuel, e.g. hydrogen and oxidizer, such as oxygen, in space ship, space vessel and non-earth body. Involves performing heat rejection from a liquid flow through radiation and/or heat exchange with heat rejection fluid.

U.S. Pat. No. 5,043,617, issued to Rostron on Aug. 27, 1991, discloses a drive system for pump-compressor that includes several motors, each operating at 12 V and drawing current not greater than 350 mA at 2.5 W.

U.S. Patent Application No. 2010/0252686A1, published to Raymond, et al. on Oct. 7, 2010, discloses a supply pump motorizing device for rocket engine of space plane that has aerobic type internal combustion engine supplied with oxidant and fuel through fuel and oxidant tanks, where fuel and oxidant tanks are independent from propellant tank.

U.S. Pat. No. 5,607,123, issued to Larsen on Mar. 4, 1997, discloses a thrust-vectoring system for rocket nozzles that has force attenuator in order to limit transient loads which nozzle and associated structure experience.

The Applicant is unaware of inventions or patents, taken either singly or in combination, which are seen to describe the instant invention as claimed.

SUMMARY OF THE INVENTION

The present invention relates to improved rocket engine systems.

An improved rocket engine system includes a propellant source, at least one power source, at least one power source motor, a rocket engine, and at least one pump. The improved rocket engine system may further include at least one of the following: at least one controller, at least one propellant valve, and a propellant pressurizing source.

As a preferred embodiment of the present invention, the improved rocket engine system includes a propellant source, two propellant valves, a first or left compartment or section, a second or right compartment or section, and a rocket engine. Each of the left and right compartments or sections includes a power source, a power source motor, a pump, and a controller. Preferably, there are left and right compartments or sections instead of just one compartment or section so that the load of the work is distributed among the compartments or sections and there is backup if one or more devices of one of the compartments or sections malfunction or does not work. It is preferred that the first valve, first power source, first power source motor, first pump, and first controller, are exactly the same, or substantially similar to, and provide substantially the same performance as the respective second valve, second power source, second power source motor, second pump, and second controller.

Figure 1:
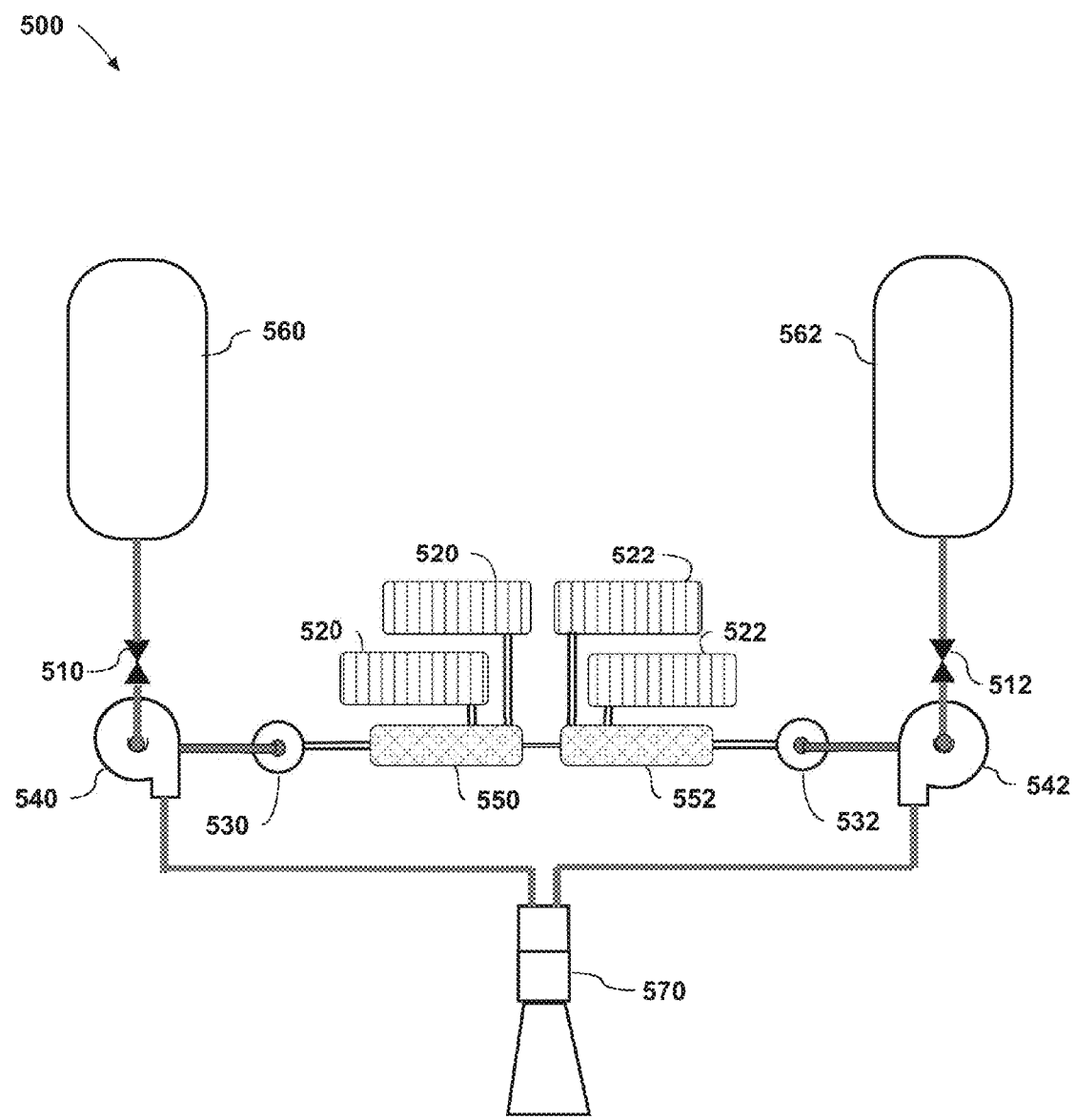
FIG. 1 is a schematic view of an embodiment of an improved rocket engine system according to the present invention.

It should be understood that the above-attached figure is not intended to limit the scope of the present invention in any way.

DETAILED DESCRIPTION OF THE PREFERRED EMBODIMENTS

The present invention is an improved rocket engine system 500 that includes a propellant source, at least one power source 520, 522, at least one power source motor 530, 532, a rocket engine 570, and at least one pump 540, 542. The improved rocket engine system 500 may further include at least one of the following: at least one controller 550, 552, at least one propellant valve 510, 512, and a propellant pressurizing source.

As a preferred embodiment of the present invention and as shown in FIG. 1, the improved rocket engine system 500 includes a propellant source, two propellant valves 510, 512, a first or left compartment or section, a second or right compartment or section, and a rocket engine 570. Each of the left and right compartments or sections includes a power source 520, 522, a power source motor 530, 532, a pump 540, 542, and a controller 550, 552. Preferably, there are left and right compartments or sections instead of just one compartment or section so that the load of the work is distributed among the compartments or sections and there is backup if one or more devices of one of the compartments or sections malfunction or does not work. It is preferred that the first valve 510, first power source 520, first power source motor 530, first pump 540, and first controller 550, are exactly the same, or substantially similar to, and provide substantially the same performance as the respective second valve 512, second power source 522, second power source motor 532, second pump 542, and second controller 552.

The propellant source preferably includes a fuel source and an oxidizer source. The propellant source may also include any other propellant that is known to one of ordinary skill in the art. The fuel source is preferably contained within a fuel tank 560, and, as a non-limiting example, may be a mono-propellant fuel. The fuel source may be a liquid fuel, a gelled fuel, a solid fuel, a gaseous fuel, a fluid fuel, a thixotropic or pseudoplastic material, and any combination thereof. The fuel source may also be any other type of fuel that is known to one of ordinary skill in the art. Preferably, the fuel source is a liquid fuel, such as, but not limited to, monomethyl hydrazine (MMH), kerosene, methane, propane, ammonia, and pentaborane. This is because a solid fuel, such as, but not limited to, butadyne mixed with aluminum and perchlorate, is more difficult to throttle or pump without being finely powdered and suspended in a transport fluid. Also, the fuel source may be a liquid mono-propellant fuel, a liquid bi-propellant fuel, a solid-liquid hybrid propellant fuel, or any combination thereof. The oxidizer source is preferably contained within an oxidizer tank 562, and, as a non-limiting example, may be a mono-propellant oxidizer, such as hydrogen peroxide. The oxidizer source may be a liquid oxidizer, a solid oxidizer, a gaseous oxidizer, and any combination thereof. The oxidizer source may also be any other type of oxidizer that is known to one of ordinary skill in the art. Preferably, the oxidizer source is a liquid oxidizer, such as, but not limited to, nitrogen tetroxide (NTO), hydrogen peroxide, liquid oxygen, nitrous oxide, and nitric acid. Also, the oxidizer source may be a liquid mono-propellant oxidizer, a liquid bi-propellant oxidizer, a solid-liquid hybrid propellant oxidizer, or any combination thereof. As a non-limiting example, when a space vehicle relating to this embodiment uses a liquid fuel or a combination or hybrid liquid-solid fuel, the space vehicle will preferably also use a liquid oxidizer or a combination or hybrid liquid-gas oxidizer, respectively.

The propellant pressurizing source is preferably contained within a propellant pressurizing tank (not shown). The pressurizing source pressurizes the fuel tank 560 and oxidizer tank 562. Preferably, the pressurizing source is a non-reactive gas, such as, but not limited to, helium, argon, neon, and nitrogen.

Preferably, the power source 520, 522 is an electric power source, and at least one electric power source 520, 522 performs at less than 1,000 kw. As non-limiting examples, each electric power source 520, 522 may be or include a battery, a fuel cell, a solar cell, a capacitor source, a diode, a transistor, other current control devices, a generator, such as, but not limited to, a mechanical generator and a turbo generator, or any combination thereof. Preferably, each electric power source may be or include multiple batteries that are individually separated, or provided in separate modules, such that each battery can be releasably jettisoned individually from the improved rocket engine system at different times during a flight when a predetermined altitude is reached. The discarding of the power source, possibly also the controller and electric motor, during a flight helps, or may help, to reduce weight and save fuel and costs, to improve performance of the engine system, and to improve the mass ratio. The multiple batteries of each compartment or section may be connected by battery connectors (or passive conductors or active circuits including diodes, transistors, thyristors, DC-DC convertors, transformers) or any other type of connector that is known to one of ordinary skill in the art. It is obvious to one of ordinary skill in the art that the power source may be a non-electric variety. The above can be improved by adding a blocking diode to each of the modules that are jettisoned and by making the modules of slightly different voltage. They can be either all brought on line simultaneously or jettisoned with reduced current through the ejection fixture. Also, the above can be improved by connecting a spacecraft electrical bus into the motor propulsion bus to provide additional energy. The above batteries can be fed to electromechanical or electro hydraulic actuators, and provide power for the steering actuators.

Preferably, the power source motor 530, 532 is an electric motor. Each electric power source motor 530, 532 is in operative communication with, preferably connected to, a corresponding electric power source 520, 522. As non-limiting examples, each electric power source motor 530, 532 may be an AC motor (such as, but not limited to, a three-phase motor), a DC motor, a motor mechanically connected to another motor, or any combination thereof. It is obvious to one of ordinary skill in the art that the power source motor 530, 532 may be a non-electric variety.

As non-limiting examples, the rocket engine 570 may be a liquid mono-propellant rocket motor, a liquid bi-propellant rocket motor, or a hybrid solid-liquid propellant rocket motor.

Each pump 540, 542 is in operative communication with, preferably connected to, a corresponding electric power source motor 530, 532. Also, each pump 540, 542 is in operative communication with, preferably connected to, the rocket engine 570. Further, each pump 540, 542 is in operative communication with the propellant source whereby the pump 540, 542 is able to supply the propellant source to the rocket engine 570. Preferably, the two pumps 540, 542 are connected, mechanically or electrically, to one another. As an alternative to a pump 540, 542 and a corresponding electric power source motor 530, 532, it is obvious to one of ordinary skill in the art that a glandless pump or the like can be used in their place. As non-limiting examples, each pump 540, 542 may a turbo pump, a mechanical displacement pump, a diaphragm pump, or any combination thereof.

Each controller 550, 552 preferably regulates voltage, current, phase, overcurrent protection, and speed control. Each controller 550, 552 is preferably located between a corresponding electric power source 520, 522 and a corresponding electric power source motor 530, 532.

Each valve 510, 512 is preferably located between the propellant source and a corresponding pump 540, 542.

As non-limiting examples, the improved rocket engine system 500 may be attached or applied to an expendable rocket stage (such as, but not limited to, a first stage, a second stage, a third stage, and/or a launch escape tower), a reusable flight or space launch vehicle, a hypersonic flight vehicle, any combination thereof, or other space vehicles known by one of ordinary skill in the art.

As a non-limiting example and in the instance when jettisoning of batteries 520, 522, or of another power source, are involved or takes place, at least one electric power source 520, 522 may perform at greater than 1,000 kw. Also, as a non-limiting example and in the instance when the improved rocket engine system 500 may be attached or applied to a reusable flight or space launch vehicle, at least one electric power source 520, 522 may perform at greater than 1,000 kw.

FIG. 1 shows an embodiment of an improved rocket engine system 500 with multiple batteries 520, 522 on each of the left and right compartments or sections where multiple batteries 522 on the left compartment or section individually separated from one another, and where multiple batteries 520 on the right compartment or section are individually separated from one another.

Figure 2:
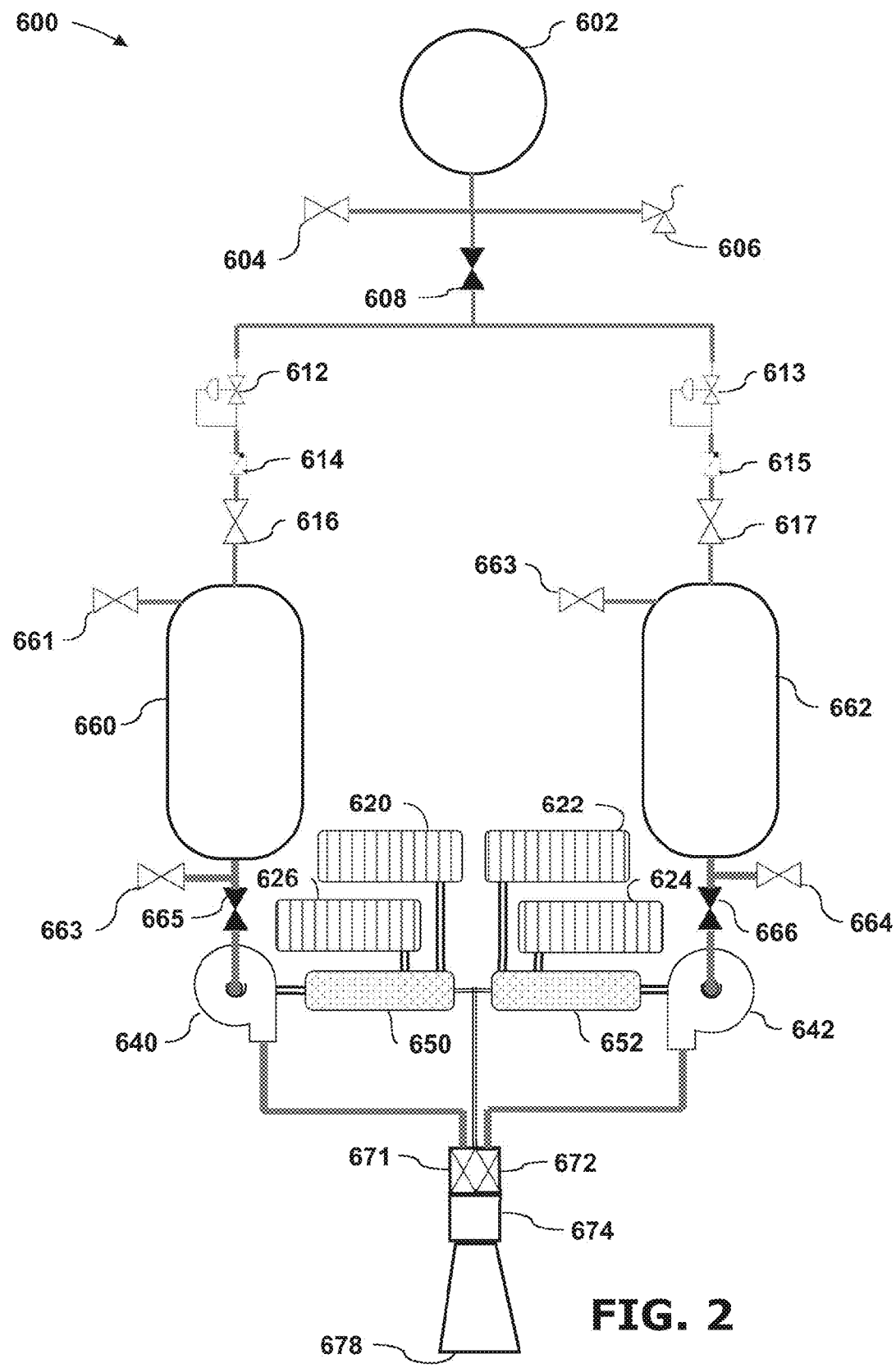
FIG. 2 is a schematic view of an alternate implementation of in improved rocket engine system with multiple energy sources suitably arranged to be jettisoned in flight and using integrated electrical motors pumps instead of mecahanically separated motors and pumps as in FIG. 1.

FIG. 2 shows a similar implementation of the improved rocket engine system 600 but simplifies the electrical pumps by embedding the pump motors inside the pump body making a combined unit 640, 642 in thermal homeostasis with the propellant temperature and conducting operating heat into the flow of propellant. FIG. 2 also shows multiple batteries 620, 622, 624, 626 that can be jettisoned at a predetermined time to reduce system mass and to improve the mass ratio.

Figure 3:
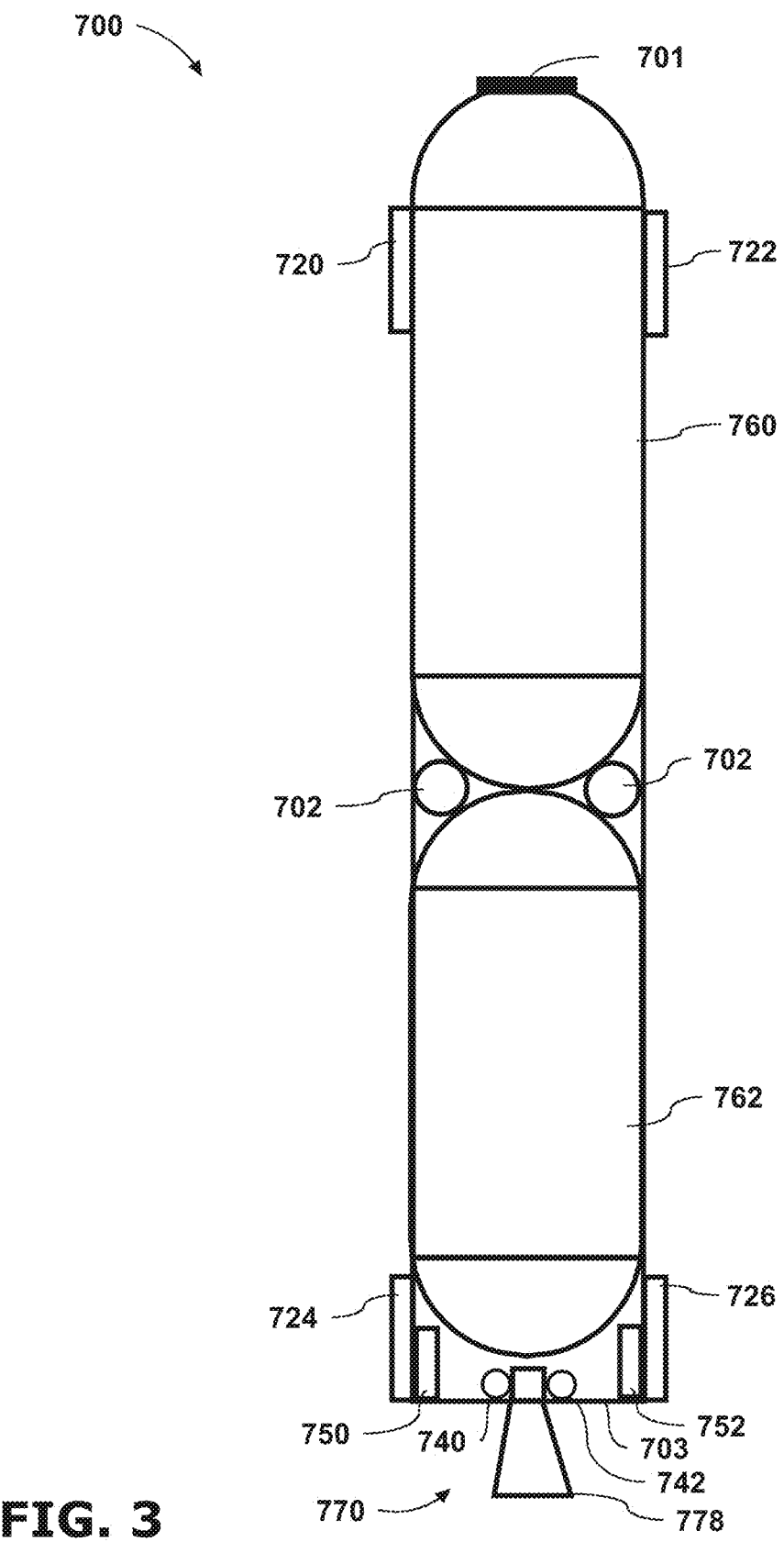
FIG. 3 shows a 2-D view of improved rocket engines system installed on rocket stage with annular batteries attached to the aft structure for easy jettison.

FIG. 3 shows an improved rocket engine system 770 attached to a rocket engine stage 700 with propellant tanks 760 762 with an energy source that can be jettisoned 724 726 connected to a controller 750 and 2 pump motors 740 742 and a rocket engine 778

As non-limiting examples, the improved rocket engine system 500 may also be applied to the following circumstances:

1) an electro-cycle engine, under 1000 kw and with or without jettisoning;
2) a planetary lander, with or without jettisoning;
3) an expendable upper stage with or without jettisoning, and over 1000 kw with jettisonning;
4) an in-space tug, with or without jettisoning;
5) a first stage booster with jettisoning above 1000 kw, and below 1000 kw with or without jettisoning; and
6) a launch escape system for survival of a crew in a capsule on a manned booster.

It is to be understood that the present invention is not limited to the embodiments described above or as shown in the attached figures, but encompasses any and all embodiments within the spirit of the invention.

What is claimed is:

1. A rocket engine system comprising:
   a propellant source comprising at least one of a fuel source and an oxidizer source;
   at least one electric power source for propulsion comprising a plurality of individually-separated, electric power source entities for propulsion;
   an ejection fixture configured to jettison at least one of said plurality of individually-separated, electric power source entities from said rocket engine system;
   at least one electric motor in operative communication with said at least one electric power source for propulsion;
   a rocket engine; and
   at least one pump,
   wherein at least one of said at least one pump is in operative communication with a corresponding electric motor of said at least one electric motor,
   wherein at least one of said at least one pump is in operative communication with said rocket engine,
   wherein said propellant source is used to cool and enhance heat rejection from said at least one electric motor where said at least one electric motor is in communication with said propellant source and operating at a temperature of said propellant source,
   wherein said at least one electric motor is submerged in a propellant source fluid flow, and
   wherein at least one of said at least one pump is in operative communication with said propellant source whereby at least one of said at least one pump is able to supply said propellant source to said rocket engine.

2. The rocket engine system according to claim 1, wherein said fuel source is selected from the group consisting of a liquid fuel, a solid fuel, a gaseous fuel, and any combination thereof, and wherein said oxidizer source is selected from the group consisting of a liquid oxidizer, a solid oxidizer, a gaseous oxidizer, and any combination thereof.

3. The rocket engine system according to claim 1, wherein said plurality of individually-separated, electric power source entities for propulsion is a plurality of batteries.

4. The rocket engine system according to claim 1, wherein said at least one pump is a turbo pump.

5. The rocket engine system according to claim 1, wherein said at least one pump consists of two pumps that are mechanically connected to one another.

6. The rocket engine system according to claim 1, further comprising at least one controller, wherein at least one of said at least one controller is located between a corresponding electric power source for propulsion of said at least one electric power source for propulsion and a corresponding electric motor of said at least one electric motor.

7. The rocket engine system according to claim 1, further comprising at least one propellant valve, wherein at least one of said at least one propellant valve is located between said propellant source and a corresponding pump of said at least one pump.

8. The rocket engine system according to claim 1, further comprising a first controller, a second controller, a first propellant valve, and a second propellant valve,
   wherein said at least one electric power source for propulsion is a first electric power source for propulsion and a second electric power source for propulsion, wherein said at least one electric motor is a first electric motor and a second electric motor,
   wherein each of said first electric motor and said second electric motor is in operative communication with a corresponding electric power source for propulsion of said first electric power source for propulsion and a second electric power source for propulsion,
   wherein said at least one pump is a first pump and a second pump, wherein each of said first pump and said second pump is in operative communication with a corresponding electric motor of said first electric motor and a second electric motor,
   wherein each of said first pump and said second pump is in operative communication with said rocket engine, and
   wherein each of said first pump and said second pump is in operative communication with said propellant source whereby each of said first pump and said second pump is able to supply said propellant source to said rocket engine, wherein each of said first controller and said second controller is located between a corresponding electric power source for propulsion of said first electric power source for propulsion and a second electric power source for propulsion and a corresponding electric motor of said first electric motor and a second electric motor, and
   wherein each of said first propellant valve and said second propellant valve is located between said propellant source and a corresponding pump of said first pump and said second pump.

9. The rocket engine system according to claim 8, wherein said plurality of individually-separated, electric power source entities for propulsion are selected from the group consisting of a plurality of batteries, a plurality of fuel cells, a plurality of solar cells, a plurality of capacitor sources, a plurality of generators, and any combination thereof.

10. The rocket engine system according to claim 8, wherein said plurality of individually-separated, electric power source entities for propulsion are a plurality of batteries.

11. The rocket engine system according to claim 10, wherein said plurality of batteries are separated into modules.

12. A rocket engine system comprising:
   a propellant source;
   at least one electric power source for propulsion;
   at least one electric motor in operative communication with said at least one electric power source for propulsion, wherein said at least one electric motor is in thermal communication with said propellant source;
   a rocket engine; and
   at least one pump, wherein at least one of said at least one pump is in operative communication with a corresponding electric motor of said at least one electric motor, wherein at least one of said at least one pump is in operative communication with said rocket engine,
   wherein at least one of said at least one pump is in operative communication with said propellant source whereby at least one of said at least one pump is able to supply said propellant source to said rocket engine, and wherein said at least one electric motor is submerged in a propellant source fluid.

* * * * *